Sept. 4, 1951  R. ELMQVIST  2,566,443
MEASURING INSTRUMENT OF THE RECORDING TYPE
Filed Sept. 21, 1949

INVENTOR
RUNE ELMQVIST

Patented Sept. 4, 1951

2,566,443

UNITED STATES PATENT OFFICE 2,566,443

MEASURING INSTRUMENT OF THE RECORDING TYPE

Rune Elmqvist, Bromma, Sweden

Application September 21, 1949, Serial No. 117,054
In Sweden October 1, 1948

4 Claims. (Cl. 346—75)

For recording rapidly changing phenomena oscillographs are commonly used in which the pointer usually is a light or electron beam. A drawback of these instruments is that the recording of the amplitudes must be made photographically. Recording instruments writing directly in ink are known but due to the great moment of inertia of the pointer hitherto used in most of these instruments it was impossible to construct the same for higher frequencies than about 100 or, at the most, 200 cycles per second.

In order to avoid the great moment of inertia measuring instruments of the recording type have been constructed with a writing element consisting of a liquid jet which is deflected under the influence of the magnitude to be measured. In instruments of this type the deflection is effected either by causing the jet to pass between two electrostatic deflecting plates or by moving a wire a shorter or longer distance into the jet. The fact that these instruments have not been used to any greater extent depends in part on the impossibility of using electrostatic deflection at great liquid speeds and when great amplitudes are desired, and in part on the instability and operational difficulties connected with the method of moving a wire into the jet.

According to the present invention these difficulties are avoided by providing a movable nozzle from which the jet issues under the influence of the magnitude, or magnitudes, to be measured.

Figure 1:
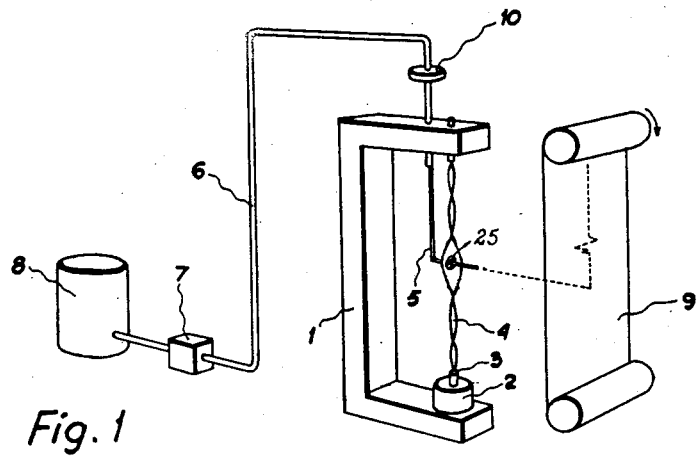
Figure 2:
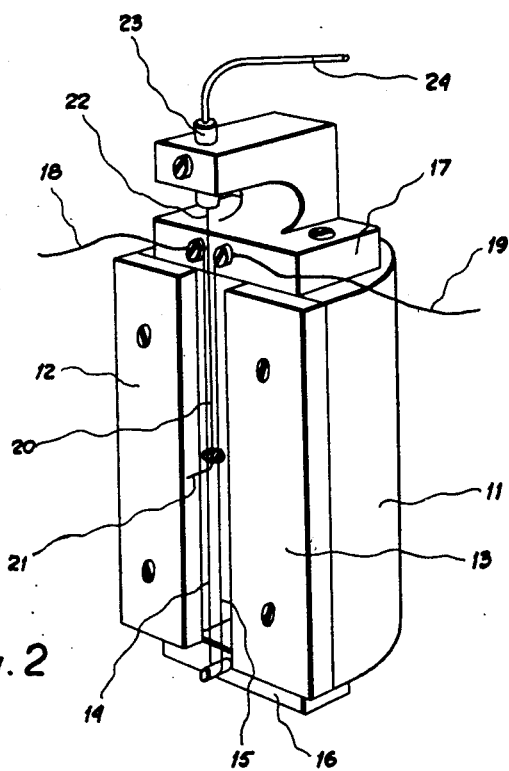

Two embodiments of the instrument according to this invention are shown diagrammatically on the annexed drawing in which Fig. 1 is a perspective view of the first embodiment of the recorder, and Fig. 2 is a perspective view of a loop oscillograph in which the usual mirror has been replaced by a nozzle through which a fine stream of liquid issues.

At the lower end of a frame 1 (Fig. 1) a measuring device is provided, which may consist, for instance, of a mechanical or electromechanical system 2 of a construction known per se, and of which a part 3 performs movements under the influence of the magnitude to be measured. Between this part 3 and the upper portion of the frame 1 a known strip-shaped motion magnifying element 4 extends, which is twisted about its own longitudinal axis with its one half in one direction and with its other half in the opposite direction so that its middle point performs rotational movements when the magnifying element is subjected to tensional changes.

To the middle of the magnifying element 4 at 25 the tip of a very thin glass tube 5 is secured having an external diameter of the order of 0.1 mm. and an orifice of the order of 0.01 mm. Immediately behind the tip, for instance at a distance of 1-2 mm. the glass tube is bent at right angles and has its upper portion extending parallel and close to the magnifying element 4. At its upper end the glass tube 5 merges into a wider tube 6 secured to the frame 1. In the tube 6 a liquid filter 10 is arranged. The tube 6 is connected to a liquid container 8 by means of a pump 7. Reference numeral 9 designates a recording tape which may be advanced in the direction of the arrow by a driving mechanism, not shown.

In operation the liquid, when put under high pressure by the pump 7, issues from the tip of the glass tube 5 as a fine jet directed towards the recording tape 9. The liquid will therefore draw a continuous line on the paper tape when the latter is moved. When the magnifying member 4 and the tip of the glass tube 5 are rotated under the influence of the phenomena to be recorded the jet is deflected at right angles to the direction of movement of the paper tape, and the line drawn on the paper tape will be a record of the phenomenon.

The embodiment of the device according to Fig. 2 is particularly suitable for an instrument adapted to measure an electric current.

This embodiment is characterized therein that the nozzle is attached to a filament loop which extends through a magnetic field and which resembles the loop of a Duddel oscillograph. In the known Duddel oscillographs a mirror is usually attached to the loop in a manner to perform rotating movements when the two filaments of the loop move in the magnetic field under the influence of the current to be measured and which current is caused to flow in opposite directions through the two filaments. According to the present invention a small nozzle is attached to the loop instead of the mirror. In Fig. 2 reference numeral 11 designates a permanent magnet with pole pieces 12 and 13. Through the air gap between these pole pieces two filaments 14 and 15 extend between insulating blocks 16 and 17. The current to be measured is supplied through wires 18 and 19. Reference numeral 20 designates a tube, preferably of glass, the lower end 21 of which is bent at right angles and forms a nozzle. The upper end 22 of the tube 21 is secured to a nipple 23. A hose 24 serves to supply liquid to the nipple.

As the tip of the glass tube 5 must be very fine, a liquid should be used that does not leave any residues tending to clog the orifice on evaporation. It may be suitable, therefore, to use a liquid without colouring additions in connection with a recording paper tape which is so prepared that the surface thereof changes its colour when hit by the jet. Thus, for instance, the paper may be covered by a film of a material which is soluble in the liquid and which is applied to the paper in such a manner that it hides the coloured surface of the paper. On the line along which this material is hit by the liquid and dissolved by the same the material becomes transparent and remains so also after evaporation of the liquid so that the own colour of the paper appears.

What I claim is:

1. In a liquid jet recorder, a frame structure, a nozzle mounted for oscillatory movement in said frame structure, means for projecting liquid in the form of a fine stream of high velocity through said nozzle, means for oscillating said nozzle in accordance with the variations of a variable magnitude to be recorded, and a record receiving member movably mounted in front of said nozzle so as to be struck by the liquid stream issuing from the same and being located at a distance from the tip of said nozzle which is greater than the distance from said tip to the axis of oscillation of the nozzle.

2. In a liquid jet recorder, a frame structure, a motion magnifying element carried by said frame structure, said element being strip-shaped and twisted about its longitudinal axis with its one half in one direction and with its other half in the opposite direction, means for exerting a variable pull on said motion magnifying element in its longitudinal direction in accordance with the variations of a variable magnitude to be recorded so as to cause the middle portion of said element to oscillate, a nozzle secured to the middle portion of said magnifying element, means for projecting liquid in the form of a fine stream of high velocity through said nozzle, and a record receiving member movably mounted in front of said nozzle so as to be struck by the liquid stream issuing through the same and being located at a distance from the tip of said nozzle which is greater than the distance from said tip to the axis of oscillation of the nozzle.

3. In a liquid jet recorder, a loop galvanometer, a nozzle secured to the loop thereof so as to oscillate in accordance with the variations of an electric current passing through the loop, means for projecting liquid in the form of a fine stream of high velocity through said nozzle, and a record receiving member movably mounted in front of said nozzle so as to be struck by the liquid stream issuing through the same and being located at a distance from the tip of said nozzle which is greater than the distance from said tip to the axis of oscillation of the nozzle.

4. In a liquid jet recorder, a frame structure, a fine tube secured to said frame structure at its one end, the other end thereof being bent to form a nozzle, means for oscillating said nozzle about an axis substantially coinciding with the axis of the nozzle-carrying portion of the tube in accordance with the variations of a variable magnitude to be recorded, means for projecting liquid in the form of a fine stream of high velocity through said nozzle, and a record receiving member movably mounted in front of said nozzle so as to be struck by the liquid stream issuing from the same and being located at a distance from the tip of said nozzle which is greater than the distance from said tip to the axis of oscillation of the nozzle.

RUNE ELMQVIST.

REFERENCES CITED

The following references are of record in the file of this patent:

UNITED STATES PATENTS

| Number | Name | Date |
| --- | --- | --- |
| 1,819,264 | Ranger et al. | Aug. 18, 1931 |
| 1,841,452 | Ranger | Jan. 19, 1932 |
| 1,941,001 | Hansell | Dec. 26, 1933 |
| 2,100,204 | Shore | Nov. 23, 1937 |
| 2,139,508 | Marcellus | Dec. 6, 1938 |
| 2,384,515 | Wise | Sept. 11, 1945 |